United States Patent [19]
Boils et al.

[11] Patent Number: 6,059,871
[45] Date of Patent: May 9, 2000

[54] INK COMPOSITIONS

[75] Inventors: Danielle C. Boils, Mississauga; Pudupadi R. Sundararajan, Oakville; Stephan V. Drappel, Toronto, all of Canada

[73] Assignee: Xerox Corporation, Stamford, Conn.

[21] Appl. No.: 09/201,397

[22] Filed: Nov. 30, 1998

[51] Int. Cl.⁷ .................................................. C09D 11/00
[52] U.S. Cl. .................................. 106/31.57; 106/31.58; 106/31.86; 106/31.88
[58] Field of Search ............................ 106/31.57, 31.88, 106/31.58, 31.86

[56] References Cited

U.S. PATENT DOCUMENTS

| | | | |
|---|---|---|---|
| 4,490,731 | 12/1984 | Vaught | 346/140 R |
| 4,751,528 | 6/1988 | Spehrley, Jr. et al. | 346/140 R |
| 4,791,439 | 12/1988 | Guiles | 346/140 R |
| 4,840,674 | 6/1989 | Schwarz | 106/122 |
| 4,853,036 | 8/1989 | Koike et al. | 106/20 |
| 5,006,170 | 4/1991 | Schwarz et al. | 106/120 |
| 5,041,161 | 8/1991 | Cooke et al. | 106/22 |
| 5,111,220 | 5/1992 | Hadimoglu et al. | 346/140 R |
| 5,121,141 | 6/1992 | Hadimoglu et al. | 346/140 R |
| 5,122,187 | 6/1992 | Schwarz et al. | 106/25 |
| 5,124,718 | 6/1992 | Koike et al. | 346/1.1 |
| 5,128,726 | 7/1992 | Cassano et al. | 355/308 |
| 5,185,035 | 2/1993 | Brown et al. | 106/31.29 |
| 5,275,903 | 1/1994 | Sundararajan et al. | 430/109 |
| 5,371,531 | 12/1994 | Rezanka et al. | 347/43 |
| 5,667,568 | 9/1997 | Sacripante et al. | 106/20 R |
| 5,688,312 | 11/1997 | Sacripante et al. | 106/31.49 |
| 5,698,017 | 12/1997 | Sacripante et al. | 106/31.49 |
| 5,700,316 | 12/1997 | Pontes et al. | 106/31.58 |
| 5,747,554 | 5/1998 | Sacripante et al. | 523/161 |

*Primary Examiner*—Mark L. Bell
*Assistant Examiner*—Veronica F. Faison
*Attorney, Agent, or Firm*—E. O. Palazzo

[57] ABSTRACT

An ink composition comprised of a vehicle and a colorant, and wherein the vehicle is comprised of a mixture of an alkane.

28 Claims, No Drawings

INK COMPOSITIONS

REFERENCE TO PATENTS AND COPENDING PATENT APPLICATIONS

Inks and ink processes, such as acoustic ink jet processes, are illustrated in U.S. Pat. No. 5,932,630, and in U.S. Pat. Nos. 5,747,554, 5,688,312; 5,667,568; 5,700,316; and 5,698,017, the disclosures of each of these applications and patents being totally incorporated herein by reference.

Hot melt inks are disclosed in U.S. Pat. Nos. 5,958,119; 5,902,390; 5,922,117 and 5,876,492, the disclosures of each of these applications being totally incorporated herein by reference in their entireties.

A number of the appropriate components and processes of the above copending patent applications and patents, and especially the ink components such as the colorants, ink additives, and the like may be selected for the inks of the present invention in embodiments thereof.

BACKGROUND OF THE INVENTION

The present invention is directed to inks, such as hot-melt ink compositions containing a colorant, and a vehicle, and more specifically, the present invention relates to hot melt inks with, for example, a controlled morphology, a melting point of, for example, from about 25° C. to about 150° C., and preferably from about 30° C. to about 100° C., and which inks are especially useful for acoustic ink printing processes and apparatuses, reference, for example, U.S. Pat. Nos. 5,121,141, 5,111,220, 5,128,726, 5,371,531, the disclosures of which are totally incorporated herein by reference, including especially acoustic ink processes as illustrated in a number of the aforementioned copending applications and patents, such as an acoustic ink printer for printing images on a record medium.

More specifically, the inks of the present invention are comprised of a colorant such as a dye or a pigment, and a vehicle comprised of a mixture of an alkane, such as an alkylene wax, and a crystallinity and spherulite growth inhibitor, such as an oxazoline, or an oxazoline available from Angus Chemical, like Alkaterge T, Alkaterge E, plasticizers, and/or nucleating agents, such as those described in U.S. Pat. No. 5,275,903, the disclosure of which is totally incorporated herein by reference. The alkane components preferably of a waxy nature are selected for the hot melt formulations, and these components are preferably crystalline or semicrystalline in the solid state. When solidified on a substrate, such as paper or a transparency, the alkanes, especially higher carbon chain alkanes with, for example, 14 or more carbons, and up to, for example, 1,000 carbon atoms, crystallize in a spherulitic morphology. It can be of importance to control the size of the spherulites to be, for example, between about 0.1 and about 10 microns, and preferably between about 1 and about 4 microns, primarily to enable optimum projection efficiency and excellent crease resistance, and wherein the opacity increases with the size of the spherulites. The spherulite size can be measured by an optical microscope with cross polarized light or by the low angle solid state light scattering method (R. S. Stein and M. B. Rhodes, *J. Appl. Phys.*, 31, 1873 (1960). Large spherulites of size greater than, for example, about 5 microns could result in brittle prints. It is a purpose of the present invention to control the size of the spherulites by formulating binary or ternary blends of waxes, oxazolines and nucleating agents. Furthermore, this invention relates to inks with additives, such as oxazolines, that when solidified form a dispersed phase of small spherulitic crystalline domains in the matrix of a wax, or vice versa.

With the inks of the present invention there can be generated excellent developed images on plain and coated papers with acceptable image permanence, excellent projection efficiency on transparencies without needing a post fusing step, and excellent crease resistance, and wherein the inks possess acceptable, and in embodiments superior lightfastness, and superior waterfastness. Moreover, in embodiments of the present invention there is enabled the elimination, or minimization of undesirable paper curl since water need not be present in the invention inks, and it is preferred that there be an absence of water, thus a dryer can be avoided thereby minimizing the cost of the acoustic ink jet apparatus and process. Furthermore, with the present invention in embodiments there are enabled inks with a low viscosity of, for example, from about 1 centipoise to about 10 centipoise at a temperature of, for example, from about 40° C. to about 160° C., and preferably from about 40° C. to about 125° C. as measured by Carri-Med CSL-100 rheometer TA Instrument, and which inks can be utilized at low jetting temperatures with an acoustic printing device, for example low temperatures of less than about 170° C., and more specifically, from about 50° C. to about 160° C.

PRIOR ART

In acoustic ink printing, the printhead generates, for example, approximately 2.2 picoliter droplets by an acoustic energy process. The ink under these conditions should preferably display a melt viscosity of about 5 to about 20 centipoise, and preferably less, such as about to about 10 at, for example, 150° C., at the jetting temperature. Furthermore, once the ink is jetted onto the paper, the ink image should be of excellent crease property, and should be non-smearing, waterfast, of excellent transparency and excellent fix qualities. In selecting an ink for such printing applications, it is desirable that the vehicle display a low melt viscosity, such as from about 1 centipoise to about 25 centipoise in the acoustic head, while also displaying solid like properties after being jetted onto paper. Since the acoustic head can usually tolerate a temperature of up to about 180° C., and preferably up to a temperature of from about 140° C. to about 160° C., the vehicle for the ink should preferably display liquid like properties, such as a preferred viscosity of from about 1 to about 10 centipoise at a temperature of from about 75° C. to about 165° C., and solidify or harden after jetting onto paper, such that the ink displays a hardness value of from about 0.1 to about 0.5 millimeter, which hardness is determined by a penetrometer according to the ASTM penetration method D1321.

Ink jet printing processes that select inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle is usually selected with a melting point above room temperature so that the ink which is melted in the apparatus will not be subject to evaporation or spillage during periods of nonprinting. The vehicle selected possesses a low temperature to permit the use of the solid ink in a thermal ink jet printer. In thermal ink jet printing processes employing hot melt inks, the solid ink is melted by a heater in the printing apparatus and utilized as a liquid in a manner similar to that of conventional thermal ink jet printing. Upon contact with the printing substrate, the molten ink solidifies rapidly, enabling the colorant, such as a dye to remain on the surface instead of being carried into the paper by capillary action, thereby attempting to enable higher print density than is generally obtained with liquid inks. Hot melt ink jets are somewhat similar to thermal ink jets, however, a hot melt ink usually contains no solvent. Thus, rather than being liquid at room temperature, a hot melt ink is typically a solid or semi-solid possessing a wax-like consistency. These inks usually need to be heated, for example, to approximately 100° C. before the ink melts and is converted into a liquid. With hot melt inks, a plurality of ink jet nozzles are provided in a printhead, and a piezoelectric vibrating element is located in each ink channel upstream from a nozzle so that the piezoelectric oscillations propel ink through the nozzle. After the hot melt ink is applied to the substrate, the ink is resolidified by freezing on the substrate.

One advantage of thermal ink jets is their compact design for the integrated electronics section of the printhead. Thermal ink jets are disadvantageous in that the thermal ink has a tendency to soak into a plain paper medium. This can blur the print or thin out the print locally thereby adversely affecting print quality. Problems have been encountered with thermal ink jets in attempting to remove from the ink moisture in a rapid manner so that the ink does not soak into a plain paper medium.

In U.S. Pat. No. 4,751,528, the disclosure of which is totally incorporated herein by reference, there is disclosed a semi-solid hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level.

Further, U.S. Pat. No. 4,791,439, the disclosure of which is totally incorporated by reference, discloses an apparatus for use with semi-solid hot melt inks having an integrally connected ink jet head and reservoir system.

In U.S. Pat. No. 4,840,674, the disclosure of which is totally incorporated herein by reference, there is disclosed an ink composition which comprises a major amount of water, an organic solvent selected for example, from the group consisting of tetramethylene sulfone, 1,1,3,3-tetramethyl urea, 3-methyl sulfolane, and 1,3-dimethyl-2-imidazolidone, and which solvent has permanently dissolved therein spirit soluble dyes.

U.S. Pat. Nos. 5,006,170 and 5,122,187, the disclosures of each of which are totally incorporated herein by reference, disclose semi-solid hot melt ink compositions suitable for ink jet printing, which inks comprise, for example, a colorant, a binder, and a propellant such as hydrazine, cyclic amines, ureas, carboxylic acids, sulfonic acids, aldehydes, ketones, hydrocarbons, esters, phenols, amides, imides, halocarbons, and the like.

U.S. Pat. No. 5,041,161, the disclosure of which is totally incorporated herein by reference, discloses an ink jet ink which is semi-solid at room temperature.

U.S. Pat. Nos. 4,853,036 and 5,124,718 disclose an ink for ink jet recording which comprises colorant, a volatile solvent with a vapor pressure of 1 millimeter Hg or more at 25° C., and a component that is solid at room temperature and with for example, a molecular weight of 300 or more.

Tektronics inks with stearyl stearamide, a Union Camp additive, and a second additive, such as Foral, are apparently known, however these inks it is believed possess poor projection efficiency, unacceptable haze values, and high melt viscosities of, for example, 15 centipoise or more, and therefore, these inks are not believed to be effective for most ink jet inks.

In acoustic ink printing, the viscosity of inks should be low, such as most preferably from about 1 to about 10 centipoise during jetting. Thus, inks which are liquid or of soft texture, such as a paste, at ambient temperatures, are easily jetted at low temperatures, such as from about 1 to about 20 centipoise at temperatures below about 100° C. However, when liquid inks are jetted on paper poor adhesion, intercolor bleeding or poor smear properties are obtained. To overcome this print quality deficiency, inks which are solid at ambient temperatures and liquid at higher temperatures are selected, such that a low viscosity is attained during jetting on paper, and once the inks are cooled on the paper by ambient conditions, it solidifies and there results improved adhesion and smear properties.

SUMMARY OF THE INVENTION

While the known ink compositions and processes may be suitable for their intended purposes, a need remains for hot melt ink compositions suitable for ink jet printing and preferably for acoustic ink printing. In addition, there continues to be a need for hot melt ink compositions which are of low viscosity, such as less than about 20 centipoise, for example from about 1 to about 20, and preferably from 1 to about 10 centipoise (cp), at a very low jetting temperature, preferably less than about 150° C., and more preferably of from about 50° C. to about 125° C., and which inks are compatible with a wide variety of plain papers and generate photographic quality images on coated papers. There is a need for a hot melt ink composition, which when solidified forms small spherulites, wherein small is, for example, from about 1 to about 10 microns, and preferably less than about or equal to about 4 microns, and there is a need for semi-solid hot melt ink compositions which generate high quality, lightfast, and excellent waterfast images on plain papers. There is also a need for semi-solid hot melt ink jet ink compositions which generate high quality, fast-drying images on a wide variety of plain papers at low cost with high quality text and high quality graphics, and wherein the colorant, such as the dye, is retained on the paper surface while the ink vehicle can continue to spread within the paper structure. Also, there is a need for hot melt ink jet ink compositions which exhibit minimal feathering. Additionally, there is a need for semi-solid hot melt ink jet ink compositions which exhibit minimal intercolor bleed. There is also a need for semi-solid hot melt ink jet ink compositions which exhibit excellent image permanence. Further, there is a need for hot melt ink jet ink compositions which are suitable for use in acoustic ink jet printing processes. Additionally, there is a need for hot melt ink compositions suitable for ink jet printing processes wherein the substrate is heated prior to printing and is cooled to ambient temperature subsequent to printing (delay printing processes). There is also a need for ink compositions suitable for ink jet printing wherein high optical densities can be achieved with relatively low dye concentrations. A need also remains for ink compositions suitable for ink jet printing wherein curling of the substrate, such as paper, subsequent to printing is minimized, or avoided, and wherein excellent crease characteristics are achievable, low smearing of the images results, the inks possess a low viscosity thereby enabling the inks to be jetted at low temperature, which is advantageous in that less power is utilized, and wherein there is enabled an extension of the life of the printhead. These and other needs can be achievable with the inks of the present invention in embodiments thereof.

Examples of features of the present invention include, for example:

It is a feature of this invention to provide a phase change or hot melt ink composition with small spherulites size of, for example, about 1 to about 4 microns, (from about to about includes all numbers and ranges therebetween throughout), when, for example, solidified on paper or transparencies.

Yet another feature of the invention is to provide an ink composition, which when solidified, the plasticizer, or nucleating agent used, such as the oxazolines form small spherulites in the matrix of a wax or vice versa, thus for example, increasing the crease resistance and projection efficiency.

It is another feature of the present invention to provide ink compositions containing a higher alkane, for example a short chain polyethylene, and small molecules, such as a commercially available oxazoline. Upon solidification, the crystallization and spherulite formation of the alkane is reduced, and wherein there can be formed nematic aggregates of the oxazoline in the alkane, providing a film with excellent projection efficiency, acceptable crease resistance, and excellent hardness.

It is yet another feature of the present invention to provide phase change or hot melt ink compositions which are compatible with a wide variety of plain papers and yield photographic quality images on coated papers.

It is still another feature of the present invention to provide hot melt ink compositions which generate high quality images on plain papers.

Yet another feature of the present invention is to provide hot ink jet ink compositions which exhibit low viscosity of from about 1 to about 10 centipoise at a temperature of from about 50° C. to about 125° C.

It is another feature of the present invention to provide ink jet ink compositions which exhibit excellent waterfastness and lightfastness image permanence.

It is yet another feature of the present invention to provide ink jet ink compositions that contain substantially no water, and which inks are suitable for use in acoustic ink jet printing processes.

It is still another feature of the present invention to provide hot ink compositions that contain no water, or minimal water, and that are suitable for ink jet printing processes, wherein the substrate is heated prior to printing and is cooled to ambient temperature subsequent to printing (heat and delay printing processes).

Another feature of this invention is the provision of an ink composition, which when solidified on a substrate, forms a dispersion of a crystalline phase in the matrix of an alkane, or alkylene waxy component.

Another feature of the present invention is to provide ink compositions suitable for ink jet printing wherein high optical densities can be achieved with relatively low colorant concentrations.

Yet another feature of the present invention is to provide water-free hot melt ink compositions suitable for ink jet printing wherein curling of the substrate subsequent to printing is minimized.

Additionally, in another feature of the present invention there are provided semi-solid hot melt inks wherein the viscosity of the ink is preferably from about 1 centipoise to about 10 centipoise at, for example, the jetting temperature which can be from about 50° C. to about 125° C., and preferably at lower jetting temperatures of from about 50° C. to about 80° C. thereby enabling excellent jetting at reasonable power levels.

The present invention relates to an ink composition comprised of a vehicle and a colorant, and wherein the vehicle is comprised of a mixture of an alkane and an additive; an ink composition comprised of a vehicle and a colorant, and which alkane is modified with an additive, which additive primarily functions to minimize the crystallinity of said alkane; an ink wherein the modification is accomplished by melt mixing the alkane and the additive, resulting in a product with a morphology where the spherulites size is less than about 4 microns; an ink wherein the alkane possesses from about 10 to about 75 carbon atoms; an ink wherein the alkane is an alkylene of a polyethylene of a molecular weight $M_W$ equal to about 500, ethylene-propylene copolymer of a molecular weight $M_W$ of about 700, ethylene-propylene copolymer of a molecular weight $M_W$ of about 1,200, or ethylene-hexylene copolymer of a molecular weight $M_W$ of about 1,100; an ink wherein the alkane is present in an amount of about 99 to about 50 weight percent, and the total of all ink components is about 100 percent; an ink wherein the alkane is present in an amount of about 90 to about 99 weight percent, and wherein the total of all ink components is about 100 percent; an ink wherein the additive is present in an amount of about 1 to about 50 weight percent; an ink wherein the additive is present in an amount of about 1 to about 10 weight percent; an ink composition wherein said additive is a solid of a hydrocarbon wax, an oxazoline, a benzoxazoline, an amide ester, or an amino ester; an ink composition wherein said additive is an oxazoline selected from the group consisting of 2-stearyl-5-ethyl-5-methoxystearate-oxazoline, 2-stearyl-5-ethyl-5-hydroxymethyl-oxazoline, 2-stearyl-4-ethyl-oxazoline, 2-stearyl-4-methoxystearate-oxazoline, 2-stearyl-4-hydroxymethyl-oxazoline, 2-stearyl-4-hydroxymethyl-bis-5,5-(methoxystearate)-oxazoline, 2-stearyl-5-hydroxymethyl-5-(methoxystearate)-oxazoline, and 2-stearyl-benzoxazoline; an ink composition wherein said alkane is a hydrocarbon wax with from about 18 to about 1,000 carbon atoms; an ink composition wherein the ink viscosity is from about 1 centipoise to about 20 centipoise at a temperature of from about 50 to about 120° C., and wherein the ink is a solid at room temperature of from about 20° C. to about 70° C.; an ink composition wherein said colorant is a dye present in an amount of from about 0.05 to about 20 weight percent, or wherein said colorant is a dye present in an amount of from about 1 to about 5 weight percent, and wherein said colorant is a dye of cyan, magenta, yellow, blue, green, brown, black, or mixtures thereof; a printing process which comprises incorporating into an acoustic ink jet printer an ink composition comprised of a vehicle and a colorant, and wherein the vehicle is comprised of a mixture of an alkane and an additive; a process wherein said ink is nonaqueous and wherein said ink possesses a viscosity of about 1 centipoise to about 25 centipoise at a temperature of from about 50° C. to about 125° C., and wherein said additive functions primarily to minimize the crystallinity of said alkane; a process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, said ink being comprised of a vehicle and a colorant, and wherein the vehicle is comprised of a mixture of an alkane and an additive; and (b) causing droplets of said ink to be ejected onto a recording sheet in an imagewise pattern at a temperature of from about 50° C. to about 125° C.; a nonaqueous ink composition comprised of vehicle and colorant, and wherein the vehicle is comprised of a mixture of an alkane and an additive that functions to control the crystallinity of said alkane; an ink wherein the alkane is an alkylene of a polyethylene, an ethylene-propylene copolymer, an ethylene-butylene copolymer, or ethylene-hexylene copolymer; an ink wherein the additive is an oxazoline; an ink wherein the additive is selected from the group consisting of 2-stearyl-5-ethyl-5-methoxystearate-oxazoline, 2-stearyl-5-ethyl-5-hydroxymethyl-oxazoline, 2-stearyl-4-ethyl-oxazoline, 2-stearyl-4-methoxystearate-oxazoline, 2-stearyl-4-hydroxymethyl-oxazoline, 2-stearyl-4-hydroxymethyl-bis-5,5-(methoxystearate)-oxazoline, 2-stearyl-5-hydroxymethyl-5-(methoxystearate)-oxazoline, and 2-stearyl-benzoxazoline; an ink wherein the alkane is a polyethylene, an ethylene-propylene copolymer, or ethylene-hexylene copolymer; an ink wherein the additive is a wax; an ink wherein the alkane is a polyethylene, an ethylene-propylene copolymer, an ethylene-butylene copolymer, or ethylene-hexylene copolymer; an ink wherein the additive is a wax; inks comprised of a colorant and certain vehicles, and which inks possess melting points of for example, of from about 25° C. to about 100° C., and once melted to temperatures of from about 50° C. to about 120° C., display a low viscosity, such as from about 0.3 to about 20 centipoise as measured by Carri-Med CSL-100 rheometer, available TA Instrument and which inks are easily jetted by the acoustic ink printing device. Once jetted on paper, and cooled by ambient conditions, the inks phase change from a liquid state to a solid state and there results improved adhesion and improved smear properties, and with no intercolor bleeding.

Also, the present invention relates to inks, which when solidified on paper or transparency, forms spherulites of a suitable effective size of, for example, less than about, or equal to about 4 microns, as measured by an optical microscope on low angle light scattering method. When a material is cooled from the melt isothermally or adiabatically, small "crystallites", of the order a few Angstroms, form first, and these crystallites aggregate into lamellae, in a spherical form, to create a "spherulite".

The ink vehicle is preferably comprised of, for example, an alkane, such as an alkane with from about 12 to about 50 carbon atoms, and more specifically from about 16 to about 32 carbon atoms, and an additive which functions as a crystallinity inhibitor. More specifically the alkane is modified with the additive by the melt mixing and heating thereof, and thereafter, permitting the resulting mixture to cool from the melt to room temperature, about for example 25° C. The additive can be selected from a number of suitable components, such as oxazolines, and mixtures thereof with other substances, that preferably provides the smallest spherulite size, hence the highest projection efficiency, for example greater than about 70 percent. Examples of the alkanes include polyalkylenes such as polyethylene waxes, such as P500 available from Petrolite, ethylene-propylene copolymers, such as EP 700 and EP 1200 available from Petrolite, ethylene-hexene copolymer, such as X1033 available from Petrolite, and the like, inclusive of similar alkylenes, alkanes, and waxes, in amounts of from about 99 percent to about 50 percent and preferably from about 99 percent to about 90 percent. The additives serve primarily as heterogeneous nucleating sites, thus the growth of spherulites to a large size is inhibited, resulting in a material with a large number of spherulites, with a small size.

Additives selected in various suitable amounts, such as from about 1 to about 50, and preferably from about 1 to about 10 percent by weight or parts, are, for example, an oxazoline, a benzoxazoline, an amide or an amino ester, and more specifically, 2-stearyl-5-ethyl-5-methoxystearate-oxazoline, 2-stearyl-5-ethyl-5-hydroxymethyl-oxazoline, 2-stearyl-4-ethyl-oxazoline, 2-stearyl-4-methoxystearate-oxazoline, 2-stearyl-4-hydroxymethyl-oxazoline, 2-stearyl-4-hydroxymethyl-bis-5,5-(methoxystearate)-oxazoline, 2-stearyl-5-hydroxymethyl-5-(methoxystearate)-oxazoline, and 2-stearyl-benzoxazoline with Alkaterge T and E oxazolines, and other oxazolines being provided by Angus Chemicals. Optional lightfast UV absorbers present in the ink composition in an amount of, for example, about 0.5 to about 5 weight percent include, for example, (1) 2-(2'-hydroxy-5'-methylphenyl) benzotriazole, available as Tinuvin 900, from Ciba Geigy Corporation; (2) 2-[2'-hydroxy-3,5-di-(1,1-dimethylbenzyl)phenyl]-2H-benzotriazole, available as Topanex 100 BT, from ICI America Corporation; (3) bis[2-hydroxy-5-tert-octyl-3-(benzotriazol-2-yl) phenyl methane, available as Mixxim BB/100, from Fairmount Corporation; (4) 2-(3',5'-di-tert-butyl-2'-hydroxyphenyl)-5-chlorobenzo triazole, available as Tinuvin 327, from Ciba Geigy Corporation; (5) 2-(4-benzoyl-3-hydroxyphenoxy)ethylacrylate (Cyasorb UV-416, #41,321-6, available from Aldrich Chemical Company), (6) tris(3,5-di-tert-butyl-4-hydroxybenzyl) isocyanurate, available as Good-rite UV 3114, from Goodrich Chemicals, and the like, and optional lightfast antioxidants for the ink compositions, present in various suitable amounts, such as from about 0.5 to about 5 weight percent, include for example, (1) bis-(1,2,3,6-tetrahydrobenzaldehyde)pentaerythritol acetal, available as Vulkazon AFS/IG, from Mobay Corporation; (2) dioctadecyl 3,3'-thiodipropionate, available as Cyanox, STDP, #41, 310-0, from Aldrich Chemical Company; (3) 2,2,4-trimethyl-1,2-hydroquinoline, available as Vulkanox HS, from Mobay Corporation; (4) octylated diphenylamine, available as Anchor ODPA, from Anchor Corporation; (5) N,N'-β,β'-naphthalene-ρ-phenylenediamine, available as Anchor DNPD, from Anchor Corporation; (6) ethyl(R)-(+)-2-{4-[trifluoromethyl)phenoxy]phenoxy}propionate, (Aldrich #25,074-0); (7) 3-hydroxy-2,2-dimethylpropyl-3-hydroxy-2,2-dimethylpropionate, (Aldrich #39,024-0), and the like.

Suitable colorants, present in an effective amount generally of from about 1 to about 25, and more specifically, for example, from about 2 to about 5 percent by weight, include pigments and dyes, pigments, dyes, mixtures of pigments, mixtures of dyes, and the like with solvent dyes being preferred. Any suitable dye or pigment may be selected providing, for example, that it is capable of being dispersed or substantially dissolved in the vehicle and is compatible with the other ink components.

Examples of pigments include Violet Toner VT-8015 (Paul Uhlich), Paliogen Violet 5100 (BASF), Paliogen Violet 5890 (BASF), Permanent Violet VT 2645 (Paul Uhlich), Heliogen Green L8730 (BASF), Argyle Green XP-111-S (Paul Uhlich), Brilliant Green Toner GR 0991 (Paul Uhlich), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2G01

(American Hoechst), Irgalite Blue BCA (Ciba-Geigy), Paliogen Blue 6470 (BASF), Sudan III (Red Orange), (Matheson, Colemen Bell), Sudan II (Orange), (Matheson, Colemen Bell), Sudan Orange G (Aldrich), Sudan Orange 220 (BASF), Paliogen Orange 3040 (BASF), Ortho Orange OR 2673 (Paul Uhlich), Paliogen Yellow 152,1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Yellow L1250 (BASF), Suco-Yellow D1355 (BASF), Suco Fast Yellow D1355, D1351 (BASF), Hostaperm Pink E (American Hoechst), Fanal Pink D4830 (BASF), Cinquasia Magenta (Du Pont), Paliogen Black L0084 (BASF), Pigment Black K801 (BASF), and carbon blacks, such as REGAL 330® (Cabot), Carbon Black 5250, Carbon Black 5750 (Columbia Chemical Company).

Dye examples include Pontamine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow #23), available from Sandoz, Inc.; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X 34, available from BASF; Carta Black 2GT, available from Sandoz, Inc.; and the like.

Particularly preferred are solvent dyes, and within the class of solvent dyes, spirit soluble dyes are preferred primarily because of their compatibility with the ink vehicles. Examples of suitable spirit solvent dyes include Neozapon Red 492 (BASF), Orasol Red G (Ciba-Geigy), Direct Brilliant Pink B (Crompton-Knolls), Aizen Spilon Red C-BH (Hodogaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodogaya Chemical Company), Sirius Supra Yellow GD 167, Cartasol Brilliant Yellow 4GF (Sandoz), Pergasol Yellow CGP (Ciba-Geigy), Orasol Black RLP (Ciba-Geigy), Savinyl Black RLS (Sandoz), Dermacarbon 2GT(Sandoz), Pyrazol Black BG (ICI), Morfast Black Conc. A (Morton-Thiokol), Diaazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), and the like.

Colorant includes, for example, pigments, dyes, mixtures thereof, mixtures of pigments, mixtures of dyes, and the like.

Optional ink additives include biocides, such as Dowicil 150, 200, and 75, benzoate salts, sorbate salts, and the like, present in effective amounts, such as for example an amount of from about 0.0001 to about 2 percent by weight, and preferably from about 0.01 to about 1.0 percent by weight. The amount of biocide is generally present in amounts of from about 10 to about 25 milligrams per one gram of ink. Other ink additives, such as humectants, and the like can also be incorporated into the inks.

The inks of the present invention can be prepared by any suitable method, such as for example simply mixing, heating, and stirring the components.

Characteristics of the inks of the present invention are as indicated herein, such as a melting point of from about 25° C. to about 100° C., and a viscosity of from about 1 centipoise to about 25 centipoise, and preferably from about 4 centipoise to about 10 centipoise as measured by Carri-Med CSL-100 rheometer, available from TA Instrument, at a temperature of preferably from about 50° C. to about 150° C.

Aspects of the present invention also relate to a process which comprises (a) providing an acoustic ink printer, such as a printer with a pool of liquid ink with a free surface, and a printhead including at least one droplet ejector for radiating the free surface of the ink with focused acoustic radiation to eject individual droplets of ink therefrom on demand, the radiation being brought to focus with a finite waist diameter in a focal plane, the ink comprising the vehicles illustrated herein, a colorant, and known ink additives, and (b) causing droplets of the ink to be ejected onto a recording sheet in an imagewise pattern at a temperature of, for example, from about 50° C. to about 150° C.; an acoustic ink printing process wherein the ink is nonaqueous and wherein the ink possesses a viscosity of from about 1 centipoise to about 25 centipoise at a temperature of from about 50° C. to about 125° C.

More specifically, the inks of the present invention are particularly suitable for printing processes wherein the substrate, such as plain paper, coated paper, transparency, or the like, is heated during the printing process to facilitate formation of the liquid crystalline phase within the ink. When transparency substrates are employed, temperatures typically are limited to a maximum of about 100° C. to about 110° C., since the polyester typically employed as the base sheet for the transparency tends to deform at higher temperatures, however specially formulated transparencies and paper substrates can tolerate higher temperatures, and frequently are suitable for exposure to temperatures of 150° C. or even 200° C. in some instances. Typical substrate heating temperatures are from about 40° C. to about 140° C., and preferably from about 60° C. to about 95° C., although the temperature can be outside these ranges.

The inks of the present invention are also suitable for use in acoustic ink jet printing processes as disclosed herein. In acoustic ink jet printing, reference a number of the copending applications and patents recited here, the disclosures of which have been totally incorporated herein by reference, an acoustic beam exerts a radiation pressure against features upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference, for example, *IBM Technical Disclosure Bulletin*, Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. The size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered.

Pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosity's and inks containing pigments and other particulate components. Acoustic ink printers embodying printheads comprising acoustically illuminated spherical focusing lenses can print precisely positioned pixels (picture elements) at resolutions which are sufficient for high quality printing of relatively complex images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of page width ejector arrays, ranging from (i) single row, sparse arrays for hybrid forms of parallel/serial printing to (ii) multiple row staggered arrays with individual ejectors for each of the pixel positions or addresses within a page width image field (i.e., single ejector/pixel/line) for ordinary line printing. Inks suitable for acoustic ink jet printing typically are liquid at ambient temperatures (i.e., about 25° C.), however, in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. Nos. 4,308,547, 4,697,195, 5,028,937, 5,041,849, 4,751,529, 4,751,530, 4,751,534, 4,801,953, and 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

Specific embodiments of the invention will now be described in detail. These Examples are intended to be illustrative, and the invention is not limited to the materials, conditions, or process parameters set forth in these embodiments. All parts and percentages are by weight unless otherwise indicated. Also, the total of all ink components is about 100 percent.

EXAMPLES

A number of ink samples were prepared by melt mixing for 5 minutes at 150° C. the pre-weighed components (actual concentrations are listed in the Table that follows) in an aluminum pan. The samples were then allowed to cool down to room temperature, about 25° C., thus forming a film that was characterized for projection efficiency, haze and spherulite size.

More specifically, an ink was prepared as follows:

1.605 grams of polyethylene P500 were rendered molten at 150° C. To the resulting molten polymer 0.874 gram of oxazoline was added. Thereafter, to the molten mixture there was added a dye, such as a neon blue dye in an amount of about 5 weight percent. The mixture resulting was then stirred at 150° C. at about 100 rpm for 15 minutes, followed by cooling to room temperature. The resulting solid film was then retained at room temperature for 24 hours before any measurements were made. There resulted an ink comprised of polyethylene P500 in the amount of 65 percent by weight, an oxazoline, such as Alkaterge E, in the amount of 30 percent by weight and a dye in an amount of 5 percent of the total weight. A number of inks were prepared by repeating this process, and with the components and amounts that are recited in the table that follows. The ink characteristics, such as P.E., projection efficiency, and haze, are provided in the table that follows.

When solidified on a substrate, such as paper or transparency, these phase change ink materials crystallized in spherulitic morphology, and wherein the size of the spehrulites is preferably, for example, from about 0.1 to about 10 microns, preferably between 1 and 4 microns, in order to have optimum projection efficiency. The opacity increased with the size of the spherulites. The spherulite size can be measured by an optical microscope with cross polarized light or by the low angle solid state light scattering method (R. S. Stein and M. B. Rhodes, *J. Appl. Phys.*, 31, 1873 (1960)). The latter gave an average size from the sample. A monochromatic, vertically polarized light was passed through the sample. The scattered light was analyzed with another nicol prism, with its optic axis horizontal. This was conventionally known as the Hv scattering method. The spherulite size was measured from the location of the maximum intensity in the four-leaf clover scattering pattern. The small spherulite size was also important to have good crease resistance. Large spherulites, of size greater than 5 microns, would lead to brittle prints. This morphology of reduced spherulitic size from about 6 to 9 micrometers to about 0.5 to 3, and more preferably, between about 0.5 to 1.0 micrometer measured with an optical microscope not only improved the projection efficiency, but also increased the crease resistance. Inks with the spherulite size of between 0.5 to 1 micrometer are ideal as these scatter minimum of light thereby improving projection efficiency when printed on transparencies. The resistance to creasing was also increased with reduced spherulite size due to better intramolecular bonding between the ink molecules, less than 4 microns, and more specifically 3 microns, enabling excellent projection efficiency and excellent crease resistance. The spherulite sizes and the morphology (wherein, for example, the morphology is such that the spherulites of Alkaterge E were dispersed in the matrix of P500, the latter being suppressed of any spherulite formation, by the presence of the additive) were measured using a Zeiss optical microscope equipped with cross polarizers.

| Reference | P500 (Polyethylene $M_w = 500$) Weight Percent | P500 (Polyethylene $M_w = 500$) (grams) | Oxazoline Alkaterge E (grams) |
|---|---|---|---|
| 274609-104-6 | 65 | 1.605 | 0.874 |
| 274609-104-8 | 89 | 1.805 | 0.22 |
| 274609-104-10 | 74 | 1.505 | 0.52 |
| 274609-104-12 | 95 | 1.901 | 0.119 |
| 274609-104-15 | 99 | 3.96 | 0.039 |

| | P500 (Polyethylene $M_w = 500$) Weight percent | P500 (Polyethylene $M_w = 500$) (grams) | Oxazoline Alkaterge T (grams) |
|---|---|---|---|
| 274609-104-20 | 50 | 0.508 | .508 |
| 274609-104-22 | 25 | 0.744 | 0.259 |
| 274609-104-24 | 10 | 0.9 | 0.1 |
| 274609-104-26 | 5 | 2.026 | 0.118 |
| 274609-104-28 | 1.17 | 2.026 | 0.024 |

P500 is the acronym for polyethylene of a molecular weight $M_w$ equal to 500. The oxazoline samples were obtained from Angus Chemical.

| Oxazoline | P-500 Concentration in Weight Percent | Pigment | P.E. | Haze |
|---|---|---|---|---|
| Alkaterge E* | 0 | 5% Neopen Blue | 87.2 | 4.4 |
| Alkaterge E* | 50 | 5% Neopen Blue | 63.4 | 40.7 |
| Alkaterge E* | 65 | 5% Neopen Blue | 54.2 | 45.2 |
| Alkaterge E* | 95 | 5% Neopen Blue | 45.9 | 46.9 |
| Alkaterge E* | 98.8 | 5% Neopen Blue | 62.1 | 48.9 |
| Alkaterge E* | 100 | 5% Neopen Blue | 23.6 | 89.4 |
| Alkaterge T* | 0 | 5% Neopen Blue | 73.4 | 15.5 |
| Alkaterge T* | 50 | 5% Neopen Blue | 43.0 | 72.9 |
| Alkaterge T* | 75 | 5% Neopen Blue | 46.0 | 74.2 |
| Alkaterge T* | 90 | 5% Neopen Blue | 75.8 | 28.4 |
| Alkaterge T* | 98.8 | 5% Neopen Blue | 52.2 | 80.7 |
| Alkaterge T* | 100 | 5% Neopen Blue | 23.6 | 89.4 |

*Amount selected enables a total of 100%, for example 50% of P-500, 5% of Neopen Blue, and 45% of Alkaterge E or Alkaterge T.

The invention inks when selected for acoustic jet printers enabled images of excellent resolution, images with superior waterfastness, such as about 100 percent waterfastness, images with minimal intercolor bleed, such as with a MFLEN of about 0 to 5, excellent image permanence, high image optical densities, such as from about 1.2 to about 2, with relatively low dye, about 2 weight percent, concentrations, and wherein curling of the substrate subsequent to printing was minimized.

P.E. is the acronym for projection efficiency; it measures how well an image is projected when printed on transparency. The higher the number the better, however, the P.E. depends strongly upon sample thickness. Therefore, values of 50 or 60 are equivalent. The results show that the projection efficiency of P500 is increased substantially when blended with Alkaterge E or Alkaterge T, for example the P.E increases from 23.6 to 75.8 by adding only 10 percent of oxazoline Alkaterge T; the P.E. goes from 23.6, for P500 alone, to 62.1 when blended with 1 percent of Alkaterge E. Therefore, the blending has a beneficial effect upon the projection efficiency of P500. The haze is a measure of how transparent is the material; the lower the value the better. The table shows that the P500 haze is terrible, but that when blending it with Alkaterge E or Alkaterge T the haze is actually much improved, from a value of 89.4 for P500 alone, one can obtain haze values 28 by adding 10 percent of Alkaterge T. The haze and projection efficiency were measured using a Haze Guard hazemeter. The samples were rendered molten onto microscope slides and permitted to solidify. The haze and projection efficiency were measured on these samples.

Other modifications of the present invention may occur to those skilled in the art subsequent to a review of the present application. The aforementioned modifications, including equivalents thereof, are intended to be included within the scope of the present invention.

What is claimed is:

1. An ink composition comprised of a vehicle, a colorant, and an alkane modified with an additive, which additive primarily functions to minimize the crystallinity of said alkane, and wherein said alkane is a polyalkylene.

2. An ink in accordance with claim 1 wherein the modification is accomplished by melt mixing the alkane and the additive, resulting in a product with a morphology where the spherulites size is less than about 4 microns.

3. An ink in accordance with claim 1 wherein the alkane possesses from about 10 to about 75 carbon atoms.

4. An ink in accordance with claim 1 wherein said polyalkylene is a polyethylene of a molecular weight $M_W$ equal to about 500, ethylene-propylene copolymer of a molecular weight $M_W$ of about 700, ethylene-propylene copolymer of a molecular weight $M_W$ of about 1,200, or ethylene-hexylene copolymer of a molecular weight $M_W$ of about 1,100.

5. An ink in accordance with claim 1 wherein the alkane is present in an amount of about 99 to about 50 weight percent, and the total of all ink components is about 100 percent.

6. An ink in accordance with claim 1 wherein the alkane is present in an amount of about 90 to about 99 weight percent, and wherein the total of all ink components is about 100 percent.

7. An ink in accordance with claim 1 wherein the additive is present in an amount of about 1 to about 50 weight percent.

8. An ink in accordance with claim 1 wherein the additive is present in an amount of about 1 to about 10 weight percent.

9. An ink composition in accordance with claim 1 wherein said additive is a solid of a hydrocarbon wax, an oxazoline, a benzoxazoline, an amide ester, or an amino ester.

10. An ink composition in accordance with claim 1 wherein said additive is an oxazoline selected from the group consisting of 2-stearyl-5-ethyl-5-methoxystearate-oxazoline, 2-stearyl-5-ethyl-5-hydroxymethyl-oxazoline, 2-stearyl-4-ethyl-oxazoline, 2-stearyl-4-methoxystearate-oxazoline, 2-stearyl-4-hydroxymethyl-oxazoline, 2-stearyl-4-hydroxymethyl-bis-5,5-(methoxystearate)-oxazoline, 2-stearyl-5-hydroxymethyl-5-(methoxystearate)-oxazoline, and 2-stearyl-benzoxazoline.

11. An ink composition in accordance with claim 1 wherein the ink viscosity is from about 1 centipoise to about 20 centipoise at a temperature of from about 50 to about 120° C., and wherein the ink is a solid at room temperature of from about 20° C. to about 70° C.

12. An ink composition in accordance with claim 1 wherein said colorant is a dye present in an amount of from about 0.05 to about 20 weight percent, or wherein said colorant is a dye present in an amount of from about 1 to about 5 weight percent, and wherein said colorant is a dye of cyan, magenta, yellow, blue, green, brown, black, or mixtures thereof.

13. A printing process which comprises incorporating into an acoustic ink jet printer an ink composition comprised of a vehicle and a colorant, and wherein the vehicle is comprised of a mixture of an alkane and an additive, wherein said alkane is polyalkylene.

14. A process in accordance with claim 13 wherein said ink is nonaqueous and wherein said ink possesses a viscosity of about 1 centipoise to about 25 centipoise at a temperature of from about 50° C. to about 125° C., and wherein said additive functions primarily to minimize the crystallinity of said alkane.

15. A process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, said ink being comprised of a vehicle and a colorant, and wherein the vehicle is comprised of a mixture of an alkane and an additive, and wherein said alkane is a polyalkylene; and (b) causing droplets of said ink to be ejected onto a recording sheet in an imagewise pattern at a temperature of from about 50° C. to about 125° C.

16. A nonaqueous ink composition comprised of vehicle and colorant, and wherein the vehicle is comprised of a mixture of an alkane and an additive that functions to control the crystallinity of said alkane, and wherein said alkane is a polyalkylene.

17. An ink in accordance with claim 16 wherein said polyalkylene is a polyethylene, an ethylene-propylene copolymer, an ethylene-butylene copolymer, or ethylene-hexylene copolymer.

18. An ink in accordance with claim 16 wherein the additive is an oxazoline.

19. An ink in accordance with claim 16 wherein the additive is selected from the group consisting of 2-stearyl-5-ethyl -5-methoxystearate-oxazoline, 2-stearyl-5-ethyl-5-hydroxymethyl-oxazoline, 2-stearyl-4-ethyl-oxazoline, 2-stearyl-4-methoxystearate-oxazoline, 2-stearyl-4-hydroxymethyl-oxazoline, 2-stearyl-4-hydroxymethyl-bis-5,5-(methoxystearate)-oxazoline, 2-stearyl-5-hydroxymethyl-5-(methoxystearate)-oxazoline, and 2-stearyl-benzoxazoline.

20. An ink in accordance with claim 19 wherein the alkane is a polyethylene, an ethylene-propylene copolymer, or ethylene-hexylene copolymer.

21. An ink in accordance with claim 16 wherein the additive is a wax.

22. An ink in accordance with claim 1 wherein the alkane is a polyethylene, an ethylene-propylene copolymer, an ethylene-butylene copolymer, or ethylene-hexylene copolymer.

23. An ink in accordance with claim 1 wherein the additive is a wax.

24. An ink composition consisting essentially of a vehicle, a colorant, and an alkane modified with an additive, which additive primarily functions to minimize the crystallinity of said alkane, and wherein said alkane is a polyalkylene.

25. An ink composition comprised of a vehicle, a colorant, a polyalkylene modified with an additive, and which additive is an oxazoline selected from the group consisting of 2-stearyl-5-ethyl-5-methoxystearate-oxazoline, 2-stearyl-5-ethyl-5-hydroxymethyl-oxazoline, 2-stearyl-4-ethyl-oxazoline, 2-stearyl-4-methoxystearate-oxazoline, 2-stearyl-4-hydroxymethyl-oxazoline, 2-stearyl-4-hydroxymethyl-bis-5,5-(methoxystearate)-oxazoline, 2-stearyl-5-hydroxymethyl-5-(methoxystearate)-oxazoline, and 2-stearyl-benzoxazoline.

26. An ink in accordance with claim 23 wherein said polyalkylene is a polyethylene.

27. An ink in accordance with claim 23 wherein said polyalkylene is an ethylene propylene copolymer, or an ethylene hexylene copolymer.

28. A process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, said ink being comprised of a vehicle and a colorant, and wherein the vehicle is comprised of a mixture of an alkane and an additive, and wherein said alkane is a polyalkylene; and (b) causing droplets of said ink to be ejected onto a recording sheet in an imagewise pattern at a temperature of from about 50° C. to about 125° C.; and wherein said alkane is a polyalkylene and said additive is an oxazoline selected from the group consisting of 2-stearyl-5-ethyl-5-methoxystearate-oxazoline, 2-stearyl-5-ethyl-5-hydroxymethyl-oxazoline, 2-stearyl-4-ethyl-oxazoline, 2-stearyl-4-methoxystearate-oxazoline, 2-stearyl-4-hydroxymethyl-oxazoline, 2-stearyl-4-hydroxymethyl-bis-5,5-(methoxystearate)-oxazoline, 2-stearyl-5-hydroxymethyl-5-(methoxystearate)-oxazoline, and 2-stearyl-benzoxazoline.

* * * * *